(12) United States Patent
Baldonado et al.

(10) Patent No.: US 8,074,165 B2
(45) Date of Patent: Dec. 6, 2011

(54) SYSTEMS AND METHODS FOR ANNOTATING OBJECTS WHEN THE ANNOTATION DEVICE DIFFERS FROM THE VIEWING DEVICE

(75) Inventors: Michelle Q. Wang Baldonado, Palo Alto, CA (US); Steve B. Cousins, Cupertino, CA (US); Polle T. Zellweger, Palo Alto, CA (US); Andreas Paepcke, Menlo Park, CA (US); Jacek S. Gwizdka, Toronto (CA)

(73) Assignee: Xerox Corporation, Norwalk, CT (US)

( * ) Notice: Subject to any disclaimer, the term of this patent is extended or adjusted under 35 U.S.C. 154(b) by 931 days.

(21) Appl. No.: 11/808,397

(22) Filed: Jun. 8, 2007

(65) Prior Publication Data
US 2007/0283241 A1    Dec. 6, 2007

Related U.S. Application Data

(63) Continuation of application No. 09/461,040, filed on Dec. 15, 1999, now abandoned.

(51) Int. Cl.
*G06F 17/00* (2006.01)
(52) U.S. Cl. .............. 715/230; 715/232; 715/233
(58) Field of Classification Search ............... 715/200, 715/230, 232, 233
See application file for complete search history.

(56) References Cited

U.S. PATENT DOCUMENTS

| | | | |
|---|---|---|---|
| 5,321,396 A | 6/1994 | Lamming et al. | |
| 5,486,686 A | 1/1996 | Zdybel, Jr. et al. | |
| 5,530,235 A | 6/1996 | Stefik et al. | |
| 5,535,063 A | 7/1996 | Lamming | |
| 5,537,526 A | 7/1996 | Anderson et al. | |
| 5,539,665 A | 7/1996 | Lamming et al. | |
| 5,564,005 A * | 10/1996 | Weber et al. | 715/863 |
| 5,806,079 A * | 9/1998 | Rivette et al. | 715/210 |
| 5,809,318 A | 9/1998 | Rivette et al. | |
| 5,832,474 A | 11/1998 | Lopresti et al. | |
| 5,838,819 A | 11/1998 | Ruedisueli et al. | |
| 5,845,301 A | 12/1998 | Rivette et al. | |
| 5,862,321 A | 1/1999 | Lamming et al. | |

(Continued)

FOREIGN PATENT DOCUMENTS

JP    A-05-225194    9/1993

(Continued)

OTHER PUBLICATIONS

"Expressive Richness: A comparison of Speech and Text as Media for Revision," Barbara L. Chalfonte et al., Proceedings of CHI '91, pp. 21-26, Apr.-May 1991.

(Continued)

*Primary Examiner* — Stephen Hong
*Assistant Examiner* — Gregory J Vaughn
(74) *Attorney, Agent, or Firm* — Oliff & Berridge, PLC

(57) ABSTRACT

Allowing annotations to occur remotely from the device in which they are viewed enables the optimal viewing device and optimal annotation device for generating annotations. Specifically, the annotation systems allow a user to associate annotations with one or more portions of an object. An object identifier is created to identify one or more objects. This object identifier is then forwarded to the annotation device. On the annotation device, the user can associate annotations with a portion of the object based on either a textual or a graphical technique. Upon completion of the annotations, the system synchronizes the annotations with the object based on the object identifier and the selection portion.

37 Claims, 13 Drawing Sheets

U.S. PATENT DOCUMENTS

| | | | | |
|---|---|---|---|---|
| 5,973,692 | A | * | 10/1999 | Knowlton et al. ............ 715/835 |
| 6,052,486 | A | * | 4/2000 | Knowlton et al. ............ 382/232 |
| 6,057,842 | A | * | 5/2000 | Knowlton et al. ............ 715/788 |
| 6,105,044 | A | | 8/2000 | DeRose et al. |
| 6,173,287 | B1 | | 1/2001 | Eberman et al. |
| 6,181,344 | B1 | | 1/2001 | Tarpenning et al. |
| 6,181,838 | B1 | * | 1/2001 | Knowlton ................. 382/305 |
| 6,279,014 | B1 | | 8/2001 | Schilit et al. |
| 6,389,434 | B1 | * | 5/2002 | Rivette et al. ............. 715/209 |
| 6,389,435 | B1 | | 5/2002 | Golovchinsky et al. |
| 6,457,026 | B1 | | 9/2002 | Graham et al. |
| 6,573,907 | B1 | * | 6/2003 | Madrane ............... 715/719 |
| 6,687,878 | B1 | | 2/2004 | Eintracht et al. |
| 6,877,137 | B1 | * | 4/2005 | Rivette et al. ............. 715/230 |

FOREIGN PATENT DOCUMENTS

| | | |
|---|---|---|
| JP | A-09-081760 | 3/1997 |
| JP | A-09-218815 | 8/1997 |
| JP | A-10-124494 | 5/1998 |

OTHER PUBLICATIONS

"Toward an Ecology of Hypertext Annotation," Catherine C. Marshall, Proceedings of ACM Hypertext 98, pp. 40-49, Jun. 1998.

"Using Collaborative Filtering to Weave an Information Tapestry," David Goldberg et al., Communications of the ACM, vol. 35, No. 12, pp. 61-70, Dec. 1992.

"A Comparison of Reading Paper and On-Line Documents," Kenton O'Hara et al., Proceedings of CHI '97, pp. 335-342, Mar. 22-27, 1997.

"Interaction Design for Shared World-Wide Web Annotation," Martin Roscheisen et al., Proceedings of CHI '95 Mosaic of Creativity, vol. 2, pp. 328-329, May 7-11, 1995.

Beyond Paper: Supporting Active Reading with Free Form Digital Ink Annotations, Bill N. Schilit et al., Proceedings of CHI '98, pp. 249-256, Apr. 18-23, 1998.

"Effects of Interfaces for Annotation on Communication in a Collaborative Task," Patricia G. Wojahn et al., Proceedings of CHI '98, pp. 456-463, Apr. 18-23, 1998.

"Fluid Links for Informed and Incremental Link Transistions," Pollle T. Zellweger et al., Proceedings of Hypertext 98, pp. 50-57, Jun. 20-24, 1998.

"An Efficient Text Input Method for Pen-based Computers," Toshiyuki Masui, Proceedings of CHI '98, pp. 328-335, Apr. 18-23, 1998.

Reid Harmon et al. "The Virtual Annotation System," Georgia Institute of Technology, IEEE, 1996, p. 246.

"Notable: An Annotation System for Networked Handheld Devices," Michelle Baldonado et al., May 15, 1999, pp. 1-2.

"A Systems View of Annotations," Steve B. Cousins et al., Feb. 8, 1999, pp 1-1 0.

"NotePals: Lightweight Note Taking by the Group, for the Group," Richard C. Davis et al., UC Berkley Computer Science Division Technical Report UCB-CSD-98-997, pp. 1-8.

"Multivalent Annotations," Thomas A. Phelps et al., Proceedings of the First European Conference on Research and Advanced Technology for Digital Libraries, Sep. 13, 1997, pp. 1-15.

"NotePals: Lightweight Meeting Support Using Personal Digital Assistants and Note-Taking Appliances," Richard Davis, Group For User Interface Research: NotePals, http://guir.cs.Berkeley.edu/projects/notepals, Oct. 8, 1997, pp. 1-2.

"Welcome to WebDAV Resources," Greg Stein et al., WebDAV Resources, http://www.webday.org/, Dec. 1, 1999, pp. 1-2.

"ComMentor: Scalable Architecture for Shared Web Annotations as a Platform for Value-Added Providers, "Stanford Digital Library Project—ComMentor, http://www.pcd.Stanford.edu/commentor, Jun. 4, 1999, pp. 1-2.

"Xlibris: An Active Reading Machine," Bill Schilit et al., FX Palo Alto Laboratory, http://www.fxpal.Xerox.com/PersonalMobile/xlibris/, Sep. 15, 1999, pp. 1-3.

* cited by examiner

SYSTEMS AND METHODS FOR ANNOTATING OBJECTS WHEN THE ANNOTATION DEVICE DIFFERS FROM THE VIEWING DEVICE

This is a continuation of U.S. patent application Ser. No. 09/461,040 filed Dec. 15, 1999.

BACKGROUND OF THE INVENTION

1. Field of Invention

This invention relates to generating annotations and associating those annotations with objects.

2. Description of Related Art

In both the paper and digital worlds, many forms of annotation are possible. For example, an annotator can mark-up paper with a red pen, highlight a passage in a textbook to mark progress, put a Post-It™ on a library book, create a web page critiquing someone else's web page, or even add digital editing marks to an electronic document. Examples of other annotation systems are the NotePals system, X Libris, Multivalent Documents (MVD), ComMentor and Microsoft® Word® annotations.

SUMMARY OF THE INVENTION

Most of the systems described above require that the annotation and the reading/reviewing occur on the same device. For example, a paper is read and the annotations, if any, are made directly on the paper. Alternatively, the "revision" format of many word processors allows the addition of "digital ink" or annotations to be made within the document as the document is being reviewed in the word processor.

The following scenario illustrates how separating the annotation device from the reading device is valuable. For example, at the end of the day, you pick up your office mail and discover that you need to review a journal article. On the way out of the office, you stop by a scanner and scan in the article. Later that evening, for example, at home, you read the paper version of the article while resting comfortably on your sofa, rather than sitting in front of your desktop computer. Since you want to offer comments that you will be able to send to a committee tomorrow, and later find and possibly further annotate with ease, you launch the annotation systems and methods of this invention on, for example, a hand-held annotation device.

To locate a pointer to the article, you perform a search of the group's networked document repository for the paper's scanned version from the hand-held annotation device. Upon searching for and finding the article, an identifier identifying the article is transferred to and recorded in the annotation device. Note that in an alternative scenario, you might choose to perform the search while still at the office on, for example, a desktop computer. In this case, the object identifier would be transferred to the annotation device when the device is connected to the network and "synchronized." The annotation device allows, for example, for the addition of a "comment" field to be associated with the paper allowing, for example, textual comments to be made, and a field to assign the paper a rating, another form of annotation. You then read the hard copy of the paper and enter any desired annotations on the annotation device.

The annotations are stored in the annotation device and associated with the paper shortly, e.g., in the time it takes for a network transfer to occur, after the annotations are made, or, alternatively, for example, associated with the paper the next day at the office when a "synchronization" of the annotations stored in the annotation device and the original version of the scanned document occurs.

The next day at the office, you can retrieve the scanned article on your desktop computer, glance over the annotations made the previous night, which have now been attached to or otherwise associated with the article, edit the comments if desired and forward the article and comments, for example, to a colleague.

In this scenario, the reviewer reads the article on paper, but creates the annotations on, for example, a hand-held device. Paper is a wonderful medium for reading due to its high resolution, portable nature and tangibility. In addition, most authors intend for their articles to be read on the familiar 8.5×11 format, and make graphical decisions based on this assumption. Hand-held annotation devices work well for annotating because of their connectivity and portable nature. Furthermore, the display size of a typical hand-held device affords the writing and reading of short pieces of text, which is much more characteristic of annotations than of article-length writings. In effect, the annotation device serves as a small, remote user interface that supplements the affordances of physical paper. Thus, annotations can be made while viewing the original document on a device separate from the annotation device, and stored for subsequent sharing, retrieving and editing.

The systems and methods of this invention allow annotations to be performed on an annotation device that differs from the viewing device.

This invention separately provides systems and methods for attaching annotations to an object.

This invention separately provides systems and methods for attaching annotations to a specific portion of an object.

The invention additionally provides systems and methods that attach annotations to a specific portion of an object based on a phrase completion technique.

This invention additionally provides systems and methods that attach annotations to a specific portion of an object based on a selection of a graphical icon that is a visual surrogate of the object.

This invention additionally provides systems and methods that allow a user to append notes or comments to one or more objects.

This invention additionally provides systems and methods for locating an object to which annotations will be attached.

The annotation systems and methods of this invention allow a user to associate annotations with one or more portions of an object that is viewed on a device that is different from the annotation device. For example, the viewing device may be as simple as paper. An object identifier is returned as the result of the user's search for the object via its characteristics. For example, the user can search a network for an identifier representing a particular device or object. In particular, the identifier could be one or more of, for example, a street address, an Internet Protocol (IP) address, or any other identifier, or handle, which uniquely and consistently identifies one or more devices or objects. This object identifier is either forwarded to the annotation device at synchronization time or directly transferred and stored in the device, depending on where the search took place. On the annotation device, the user can associate annotations with the object identifier. Upon completion of the annotations, the systems and methods of this invention synchronize the annotations with the object based on the object identifier.

The annotation systems and methods of this invention also allow a user to associate annotations with one or more portions of an object using a combination of graphical and textual techniques. Specifically, an object identifier is returned that identifies one or more objects. This object identifier and a digital representation of that object, its digital surrogate, is then copied and forwarded to the annotation device. On the annotation device, the user can use graphical and textual techniques on this surrogate to specify the particular location at which annotations are to be associated. Upon finding the correct location, annotations are entered and associated with the object identifier and the location information. Upon completion of the annotations, the systems and methods of this invention synchronize the annotations with the object based on the object identifier.

These and other features and advantages of this invention are described in or are apparent from the following detailed description of the preferred embodiments.

BRIEF DESCRIPTION OF THE DRAWINGS

The preferred embodiments of the invention will be described in detail, with reference to the following Figures, wherein.

DETAILED DESCRIPTION OF PREFERRED EMBODIMENTS

The systems and methods of this invention allow annotations for an object to be generated remotely from the object and associated with the object via an identifier that is returned as the result of a user search. Specifically, the systems and methods of this invention allow a user to search for an object by its characteristics, create annotations for the object, and associate those annotations with the obtained object identifier, which is in turn associated with the object. For example, the user can make these annotations on a small, hand-held annotation device such as the Palm® personal digital assistant, the Hewlett Packard® Jornada™ or the Compaq® Aero™. Then, upon completion of the annotations, the annotations stored in the annotation device are associated with the object through a synchronization process.

Specifically, the user can search for an object, such as a document or a piece of equipment. The search returns an object identifier that corresponds to the object, and, optionally, a digital representation, or surrogate of the object. At synchronization time, the annotation device receives the appropriate search result. However, if the user performed the search directly from the annotation device, this first synchronization step is not necessary. Upon obtaining the object identifier, the user can then enter annotations into the annotation device. These annotations are associated with the object identifier and stored in the annotation device. Then, when the user re-synchronizes the annotation device with the object, the annotation(s) stored on the annotation device are transferred to and associated with the object.

Figure 1:
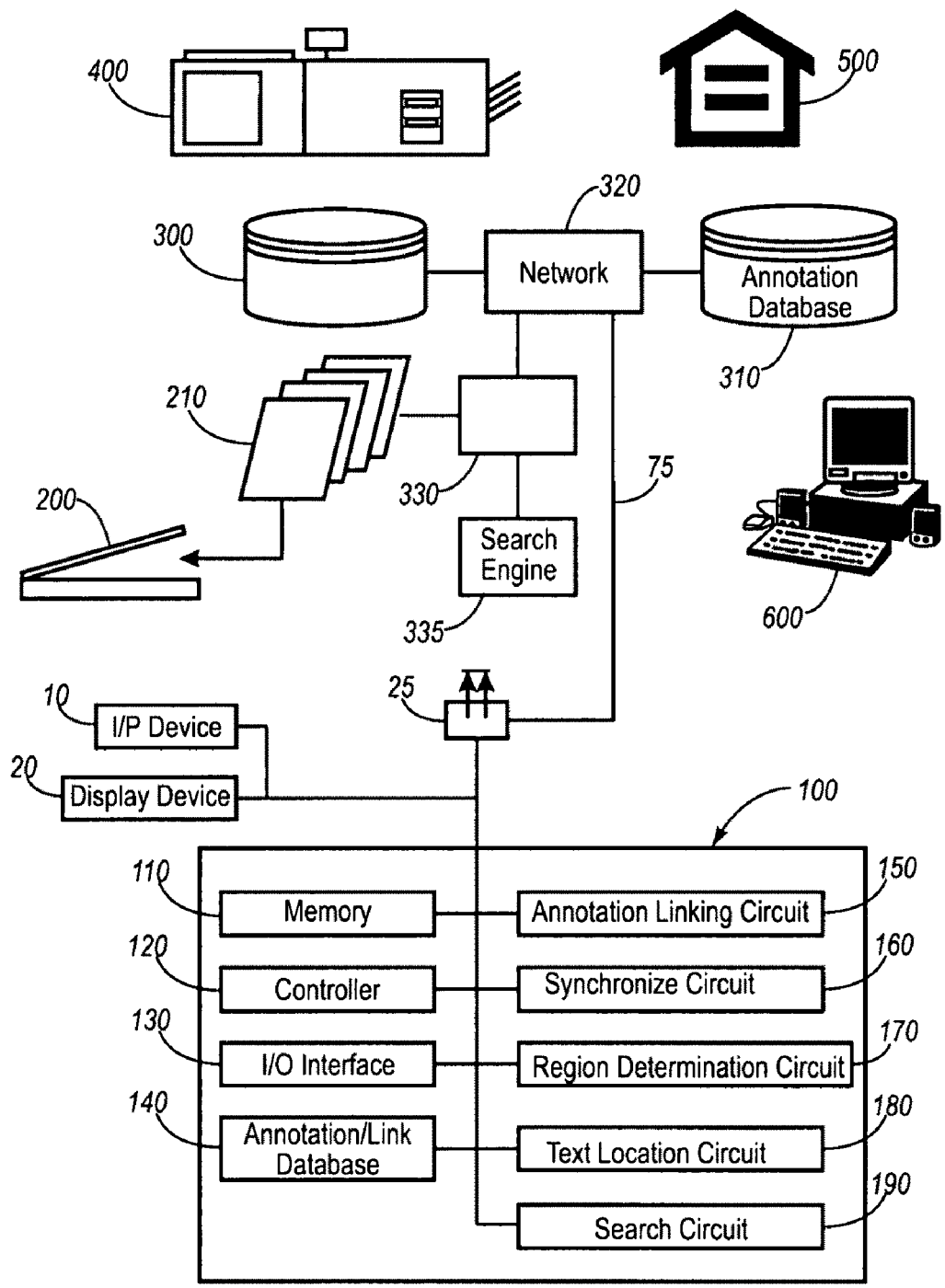
FIG. 1 is a functional block diagram showing a first exemplary embodiment of an annotation system according to this invention.

FIG. 1 illustrates one embodiment of the components of an annotation device 100 and some exemplary objects to which annotations can be attached in accordance with the systems and methods of this invention. The annotation device 100 comprises a memory 110, which is an information storage media, a controller 120, an I/O interface 130, an annotation/link database 140, an annotation linking circuit 150, a synchronize circuit 160, a region determination circuit 170, a text location circuit 180 and a search circuit 190 interconnected by bus 50. The annotation device 100 is connected to an input device 10, a display device 20 and a synchronization link 25. Additionally, the annotation device 100, via synchronization link 25, obtains identifiers and associates annotations with one or more of the following exemplary objects: a media type object 210, an electronic document stored on a document storage database 300, a device type object 400, a location-type object 500, and an object stored on a personal computer or workstation 600.

Additionally, the annotation device 100 is capable of being attached to, via synchronization link 25, one or more distributed networks 320 and 330, interconnected by link 75, which in turn may be connected to one or more search engines 335, document storage databases 300, and annotation databases 310.

Furthermore, the links 50 and 75 can be wired or wireless links or any other known or later developed element(s) that is capable of supplying electronic data to and from the connected elements.

In operation, a user determines that annotations are to be associated with one or more objects. In cooperation with the search circuit 190, the user locates the object(s) to be annotated by specifying the characteristics of the object(s). For example, the user can enter keywords, such as a title, to locate a particular document, a device and location, such as the color printer in room 11A on the fourth floor, to locate an object, a street address, to locate a building, an Internet Protocol (IP) address or path to a location on a distributed network to locate a file, or the like. Additionally, a user can enter search criteria on an Internet search engine to locate an object and its associated object identifier. In general, any known or later developed technique to search for an object can be used with the systems and methods of this invention. Furthermore, as previously discussed, this search can occur on any device that is capable of locating an object and retrieving and/or generating an identifier associated with the object.

Next, in cooperation with the synchronize circuit 160, the annotation device 100 receives the object identifier(s) for the object(s) to be annotated. For example, if the object to be annotated is a document stored electronically on a distributed network, the user uses the search circuit 190, or comparable search tool interface, to locate the object. Then, the annotation device 100, via the synchronization link 25, can be connected to a node of the distributed network. Then, the object identifier which identifies the electronic document to be annotated, which was identified by the search, is transferred and stored within the annotation device 100 in the annotation/link database 140. The user, via input device 10 and display device 20, then enters the annotation(s) to be associated with object. These annotations are stored in the annotation/link database 140 until the annotation device is again "synchronized" with the object. During the synchronization step, the annotations made on the annotation device 100 are transferred to, and associated with, the object.

The previous paragraph describes the case where a user employs a search interface on the desktop computer to find an object identifier, in which case the annotation device receives the identifier via synchronization. However, this example describes the case where a user employs a search interface directly on the hand-held device and thus does not need to do synchronization to get the object identifier. For example, if the object to be annotated is an electronic document stored on a distributed network, a user, via input device 10, enters one or more search criteria into the annotation device 100. The search criteria can be as simple as a word or phrase, such as a document name, to highly complicated search strategies that may include Boolean operations. The search circuit 190, having received the search terms from the user input device 10, via link 50, is then ready to commence a search for the object to be annotated. The search circuit 190, cooperating with the controller 120 and the memory 110, queries all or a subset of the available objects to which annotations can be made via the synchronization link 25. For example, if the object to be annotated is an electronic document stored in the document storage database 300, the annotation device 100, via the synchronization links 25 would query the documents within the document storage database 300 to retrieve a list of available documents that correspond to the search criteria.

Alternatively, an object identifier associated with a particular object can be forwarded directly to the annotation device 100. For example, if the object to be annotated is a location-type object 500 or a device type object 400 an object identifier may already be known for that particular object type. Thus the object identifier corresponding to the object to be annotated can be directly entered into the annotation device 100 and at the direction of the synchronize circuit 160 stored in the annotation/link database 140.

It should be appreciated, that at least for both the location-type object 500 and the device type object 400 a plurality of annotatable objects can be included in these objects. Accordingly, it should be appreciated that both the searching for an annotatable object and the direct link to an annotatable object methods can be performed and combined in any fashion depending on the particular environment and/or objects to be annotated.

The synchronize circuit 160, in cooperation with the memory 110, the controller 120 and the annotation/link database 140 then creates a surrogate of the object. The surrogate may be an identifier, a copy of the object, or some other digital representation of the object. In particular, the digital representation may be a compact encoding of just the facets of the object that are important for annotation. Two alternatives include a textual index of an object, recording the keywords of an object and their positions in the object, usually used for a document, and a graphical thumbnail that is a visual representation of the object. Additionally, the thumbnail can be simply an icon that is the same for all documents. Alternatively, the type of surrogate created for the object may be determined interactively by the user. The surrogate and the object identifier are then forwarded to the annotation device, via synchronization link 25 and I/O interface 130 and stored in the annotation/link database 140.

Additionally, the annotation device 100, upon synchronizing and receiving an object identifier from one or more objects, can also indicate to the user, via, for example, display device 20, whether any annotations are currently associated with the object. If annotations are associated with the object, the annotation device 100, via, for example, display device 20, can query the user whether these annotations should also be downloaded to the annotation device 100. If the user desires to view the previous annotations, or a portion thereof, currently associated with an object, the annotation device 100, with the cooperation of the memory 110, the controller 120, the I/O interface 130 and the synchronization link 25, downloads the annotation to the annotation device 100. At this point, the annotation device 100 has all the information necessary to allow the user to associate one or more annotations with the object, or with one or more annotations already associated with the object, that has an object identifier stored in the annotation device 100.

Additionally, if annotations were downloaded as part of the synchronize function, the annotation device 100 can query the user, which, if any, of those annotations are to be viewed. A user can then select, via, for example, input device 10, which previous annotation is to be viewed and displayed on display device 20.

The user is not limited to associating annotations with an object generically. To the contrary, a user can attach one or more annotations to any portion of an object. For example, if numerous annotations are already associated with an object, and these annotations are downloaded to the annotation device 100, a user can then append annotations to the downloaded, existing annotations. In this instance, the object identifier contains the necessary information to identify the object, as well as the particular annotation already associated with that object. In general, an annotation can be associated with any object, or any portion of an object, provided a handle, or unique identifier, is available for that portion.

As will be discussed hereinafter, a user has two options for attaching annotations to an object. The first option is to globally attach an annotation to an object. In this instance, the annotation is associated with the object identifier. The second option is to specify through a combination of textual and graphical techniques a more specific location for the annotation with respect to the object. For example, in a textual document, a user can attach one or more annotations to a word, phrase, or a portion of text within that document. In this instance, the annotation is associated with the object identifier, as well as a handle, or identifier, corresponding to the portion of text selected to be annotated. Additionally, a user can attach one or more annotations to a region of a device, document or location and have the annotation associated with that region, for example, the fuser assembly in a photocopier.

Thus, while the methods of attaching annotations to objects, or portions of objects, will be described in relation to specific embodiments, it is to be appreciated that any combination of techniques can be used on any type of object provided the necessary object identifier and, if appropriate, handle information is available to attach the one or more annotations to the one or more particular object locations.

For example, if the object to be annotated is a media type object 210, such as a newspaper, article, school paper, book, letter, or the like, a user can associate annotations with the object generally, or to particular portion of the object. To generally associate an annotation with the object, an object identifier is created, if not already in existence, that identifies the object and a corresponding portion of the annotation database 310 that stores the annotations made to the object. For example, a user could scan in the media type object 210 via scanner 200. The digital version of the object could then be transferred to the annotation device 100 via, for example, a personal computer, the synchronization link 25 and in cooperation with the synchronize circuit 160. While it is possible that the entire scanned image is transferred to the annotation device, a more compact representation is typically generated on the annotation server, for example on the network, and then transferred to the annotation device. The annotation device 100 then creates a digital surrogate of the object and stores this digital surrogate and the object identifier in the annotation/link database 140. Thus, for this illustrative example, the object identifier identifies the object as well as the portion of annotation database 310 that stores the annotations associated with the object. This digital surrogate might include both a textual index for the document, where the text is first obtained by performing optical character recognition on the document, and also a graphical icon that represents a page in the document, which may or may not have details that are specific to the document.

With the digital surrogate of the object, and the object identifier, annotations can be associated with the object. In particular, a user can associate specific annotations with particular portions of text efficiently. For example, using the text location circuit 180, and a combination of the input device 10 and the display device 20, a user enters a word or phrase into the annotation device 100. The text location circuit 180 searches for the text corresponding to that entered by the user and displays any found text on display device 20. Additionally, the text location circuit 180 can perform a phrase completion technique to aid the user in locating a particular word or phrase in the media type object 210. This is an useful for a user creating annotations on a hand-held device for which text entry may be slow and tedious. Once the specific portion of text is located for which the user wants to attach an annotation, the text location circuit 180, in cooperation with the annotation linking circuit 150, determines a handle, or unique identifier, associated with the particular located text portion. The user, via input device 10, and in cooperation with the memory 110, the controller 120, an the I/O interface 130 then enters one or more annotations to associate with that particular text portion. These annotations are then stored in the annotation/link database 140.

Given that annotation devices may have limited memory and computational power and that the network link for synchronization may have low bandwidth, instead of associating an annotation with a particular word or phrase within the media type object, the user can indicate areas on the graphical icon that is a visual surrogate of the object. Because of the familiarity of a document icon and a user's ability to understand that the upper-left portion of the icon corresponds to the upper-left portion of the document page currently being read, the user can indicate an area for annotation simply by indicating the appropriate region on the icon. This may be performed by pointing with, for example, the mouse cursor at a location, or drawing a box, or other shaped region, as might be done with a digital drawing tool.

As with the phrase completion method, the annotation linking circuit 150 determines an appropriate handle for the particular region chosen and stores this handle, in combination with the object identifier and any entered annotation in the annotation/link database 140. Finally, the user can combine the techniques of indicating a region in an icon with phrase completion for an even more efficient method of specifying where an annotation should be attached. For example, the user could indicate that the annotation belongs to a particular region of a page and then use phrase completion to further specify the annotation location.

Alternatively, assume the object is a device type object 400. For example, a device type object could be any electronic system(s) such as a photocopier, a printer, a manufacturing or an industrial machine, HVAC equipment, a computer, a disk and disk drive, a telephone, a washing machine, or any other device or object to which it would be helpful to attach annotations. For example, it may be beneficial to attach service records to a photocopier so that each service technician can be provided with a history of the photocopier each time service is performed. Thus, to initiate annotation of a device type object 400, the annotation device 100 is synchronized with the device type object 400. Even though this device is clearly in the physical world and not in the digital world, it may have a commonly agreed upon digital identifier, and so be a candidate for annotation. The technician could search for this device by specifying characteristics like its location and its device type. Thus, for example, when a service technician comes to repair a machine, the service technician would perform a search to locate an object identifier for that machine, and synchronize the annotation device 100 with that object identifier. For example, as previously discussed, the synchronization link can be a wired or a wireless link or any other known or later developed element(s) that is capable of connecting the annotation device to a computer that provides a search facility for locating the object to be annotated.

As with the other annotatable objects, an object identifier is transferred from the device type object 400 to the annotation device 100 during synchronization at the direction of the synchronize circuit 160. Thereby, the synchronize circuit 160 obtains an object identifier corresponding to the object to be annotated. This object identifier is then stored in the annotation/link database 140. Additionally, if annotations are already associated with the device type object 400, the user, via input device 10, can select one or more of these annotations to be downloaded to the annotation device 100. The annotations can then be reviewed, and further annotated, if desired. A user then can add annotations to the object. For example, as discussed in relation to the media type object 210, a user can select a portion of the device type object 400 with which to associate an annotation. This can be accomplished by, for example, having a standard icon for a photocopier that allows the user to indicate regions of the photocopier for annotation. A less compact but more detailed graphical surrogate could be obtained by adding a camera (not shown) to the annotation device 100. This camera can capture an image of the device type object 400 to be annotated and can create a graphical thumbnail which is displayed on the display device 20. Therefore, in conjunction with the region determination circuit 170, a user can select a particular region or regions of the device type object 400 with which to associate one or more annotations. The annotation linking circuit 150 then associates the selected region with a particular unique identifier that is stored in the annotation/link database 140 along with the annotation(s).

For example, this thumbnail image can be displayed on the display device 20. A user would then select a portion of the thumbnail. This portion would have a handle, or identifier, that would identify that particular portion of the object. Again, the user's task of indicating where the annotation should be attached can be facilitated by combining graphical and textual techniques for determining where the annotation should be attached. For example, photocopiers typically have textual labels on the machine that indicate parts. Users could point to a region on the standard photocopier icon and then begin to enter the name of the desired part. Because the search space has been constrained by indicating the relevant region, the convergence on the relevant facet of the object for annotation happens more quickly.

Alternatively, assume the object is a location type object 500. For example, a location type object could be a museum, a building, a historic landmark, a painting in a museum, a conference room, a theater, a hallway, a person, an animal, a car or any other object to which it would be helpful to attach annotations. For example, it may be beneficial to attach comments on a particular piece of art on a museum. Alternatively, at preview time for an auction, it would be helpful to attach comments on objects that may be bid on during the auction itself. Furthermore, it may be beneficial to attach immunization records to a dog so that a veterinarian can be provided with a medical history of the animal which can be updated as necessary. Thus, to initiate annotation of a location type object 500, the user searches for the particular object, obtains thereby the common identifier for that object, and then the annotation device 100 is synchronized.

As with the other annotatable objects, an object identifier is transferred from the device type object 400 to the annotation device 100 during synchronization at the direction of the synchronize circuit 160. Thereby, the synchronize circuit 160 obtains an object identifier corresponding to the object to be annotated. This object identifier is then stored in the annotation/link database 140. Additionally, if annotations are already associated with the device type object 400, the user, via input device 10, can select one or more of these annotations to be downloaded to the annotation device 100.

The annotations can then be reviewed, and further annotated, if desired. A user then can add annotations to the object. For example, as discussed in relation to a media type object 210, a user can select a portion of the location type object 500 with which to associate an annotation. Again, an efficient combination of icon pointing and phrase completion can be used. Alternatively, if a more detailed graphical surrogate is desired, a picture of the object can be used as a graphical surrogate. This can be accomplished by, for example, adding a camera (not shown) to the annotation device 100. This camera can capture an image of the device type object 400 to be annotated. As a result, a graphical thumbnail displayed on the display device 20. Therefore, and in conjunction with the region determination circuit 170, a user can select a particular region or regions of the location type object 500 with which to associate one or more annotations. Furthermore, the user can then additionally specify the region with text. For example, the user may indicate that a particular hallway in a building is to be annotated, for example, the "icon" for a hallway may use conventional design elements from architectural floorplans, and then use text entry to begin entering a room number. Phrase completion could take into account the context specified graphically and the user would quickly converge on the desired location for annotation. The annotation linking circuit 150 then associates the region with a particular unique identifier that is stored in the annotation/link database 140 along with the annotation(s).

Alternatively, assume the object is a digital document stored on a computer 600. For example, the object could be any digital document such as a word processed document, a presentation, a scanned document, a web page, a spreadsheet, or any other electronic version of an object to which it would be helpful to attach annotations. For example, it may be beneficial to attach comments on a particular draft document before a presentation. Again, the user searches for the electronic document by its characteristics, thus obtaining a digital identifier for the object. In this case, the object itself could be fetched. Once again, the identifier plus an optional digital surrogate, which could in this case be a copy of the document itself, is downloaded onto the annotation device via the synchronization circuit.

As with the other annotatable objects, an object identifier is transferred from the computer 600 to the annotation device 100 during synchronization at the direction of the synchronized circuit 160. Thereby, the synchronize circuit 160 obtains an object identifier corresponding to the object to be annotated. This object identifier is then stored in the annotation/link database 140. Additionally, if annotations are already associated with the device type object 400, the user, via input device 10, can select one or more of these annotations to be downloaded to the annotation device 100. The annotations can then be reviewed, and further annotated, if desired. A user then can add annotations to the object. For example, as discussed in relation to the media type object 210, a user can select a portion of the electronic document with which to associate an annotation. This can be accomplished by, for example, dividing the digital document into portions, e.g., upper left, lower right, upper half, or the like. Therefore, and in conjunction with the region determination circuit 170, a user can select a particular region or regions of the electronic document with which to annotate one or more annotations. The annotation linking circuit 150 then associates the region with a particular unique identifier that is stored in the annotation/link database 140 along with the annotation(s).

For example, this thumbnail image can be displayed on the display device 20. A user would then select a portion of the thumbnail. This portion would have a handle, or identifier, that would identify that particular portion of the object. For example, the thumbnail could be a portion of one or more pages of a document. Thus, by selecting a region of the thumbnail corresponding to a particular portion, annotations can be associated with that portion. Again, the thumbnail need not be specific to the document.

Upon completion of any annotations, the annotations need to be associated with the object. Thus, upon completion of the annotations, the synchronize circuit 160, via the bus 50 and synchronization link 25, forwards the annotations stored in the annotation device 100 to the annotation database 310. Additionally, along with the annotations are forwarded any specific identifiers, or handles, that may specify additional or specific location information about the one or more annotations. For example, if the object is a digital document type object, the annotation database 310 could be distributed at different nodes of a distributed network. Thus, a database (not shown) would store the document, for example, at memory location on a distributed network or personal computer, and the annotation database 310 would store the one or more annotations associated with the object. In general, the annotation database 310 allows annotations to be stored remotely from the object itself.

Therefore, as previously discussed, the annotations are associated with the object and can be later retrieved for viewing or further annotations. For example, as understood by one of ordinary skill in the computer arts, a flag can be added or otherwise attached to the original document indicating annotations are present.

Figure 2:
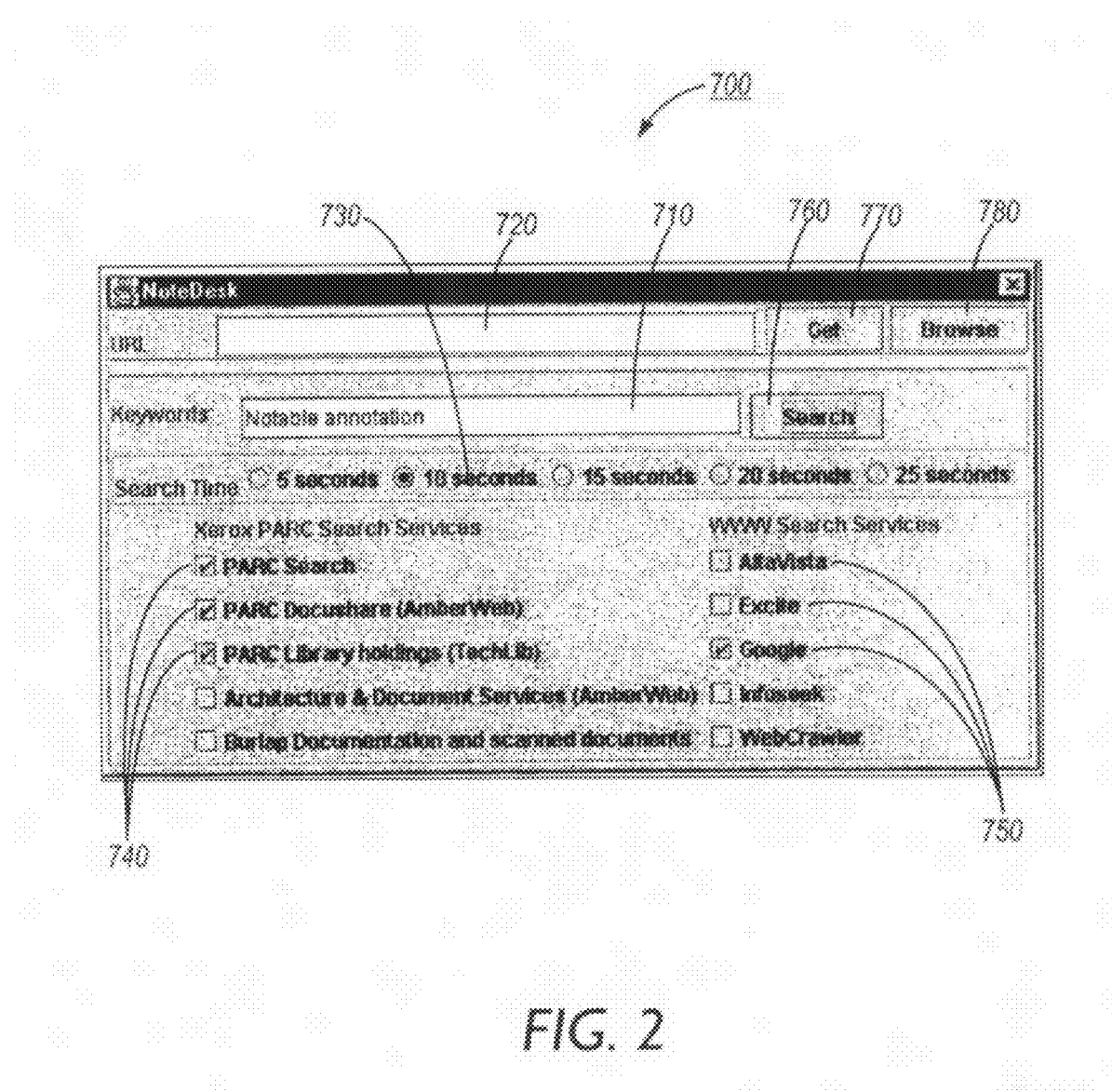
FIG. 2 shows an exemplary search user interface in accordance with the systems and methods of this invention.

FIG. 2 illustrates an exemplary graphical user interface 700 that can be used in cooperation with the search circuit 190. In particular, the search interface 700 comprises a key word portion 710, a direct identification portion 720, a search time limit portion 730, one or more local search services 740, one or more Internet search services 750, a search button 760, a get button 770 and a browse button 780. For example, to commence a search, a user enters one or more key words into the key word portion 710. Upon entering the one or more key words, the user presses the search button 760 to retrieve objects corresponding to the key word. Alternatively, the user can specify directly the object identifier in the direct identification portion 720. For example, a user can enter a URL or a Global Position Satellite (GPS) coordinate corresponding to the object. Then, by pressing the get button 770, the user indicates that this identifier should be forwarded to the annotation device. Alternatively, the user can locate a document by browsing the files that are located on the device displaying the search interface, using the browse button 780. Once such a document, or any object, is located in this fashion, the identifier can be forwarded to the annotation device.

Additionally, the search interface 700 may contain portions limiting the duration, extent, or other factors pertaining to the search itself. For example, the search interface 700 can have a search time limit portion 730 that could restrict the amount of time spent searching for the object to be annotated. Additionally, the search interface 700 can have one or more local search services 740 and Internet search services 750 that allow, for example with a click of a mouse, boundary conditions to be placed on the one or more searched for key words.

Figure 3:
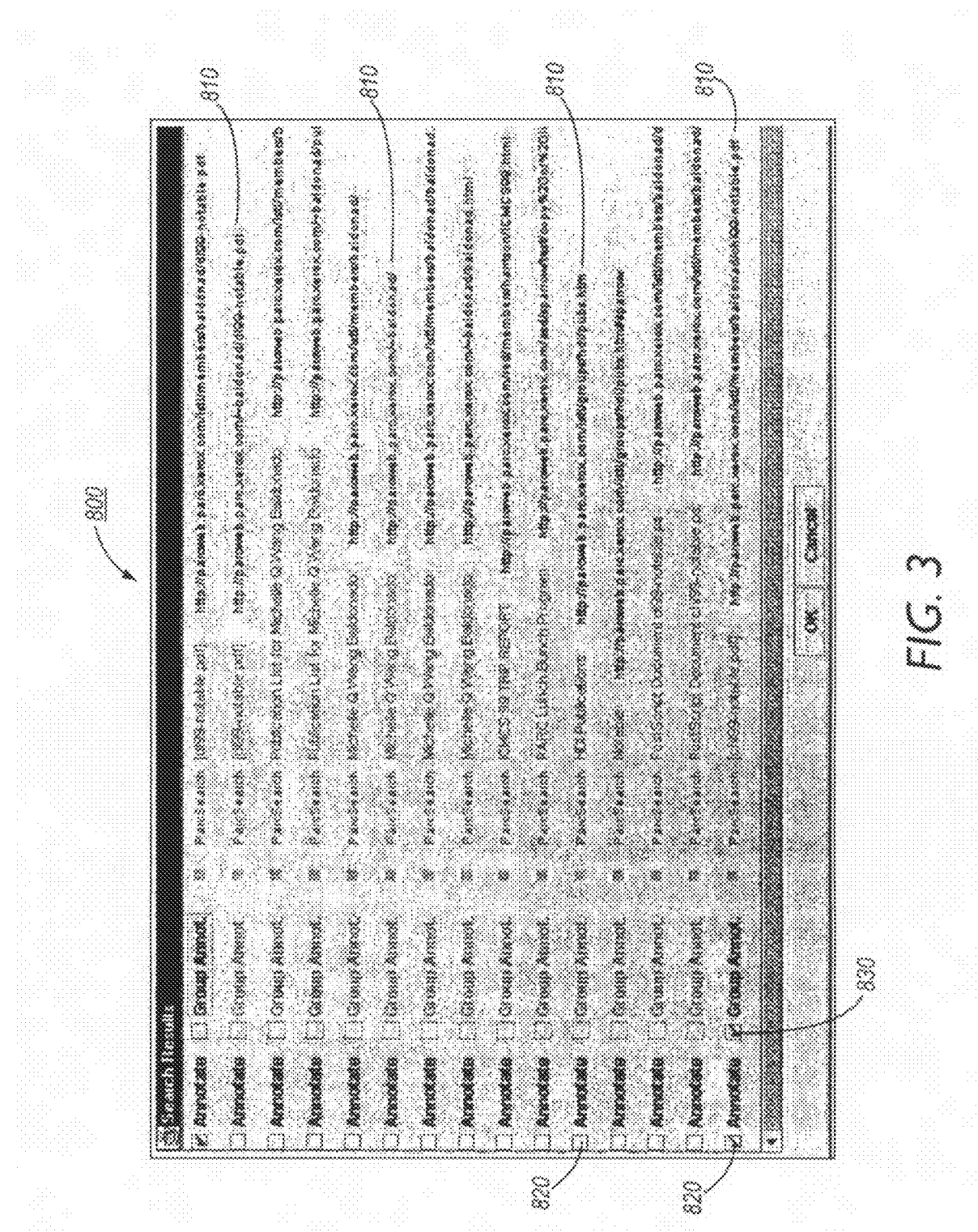
FIG. 3 illustrates an exemplary search results user interface in accordance with the systems and methods of this invention.

FIG. 3 illustrates an exemplary search result user interface 800. The search result user interface 800 comprises one or more results 810 corresponding to the searched for object. Additionally, the search result user interface 800 comprises one or more selectable portions 820 indicating that object is selected for annotation. Once an object is selected for annotation, the object identifier associated with that object is transferred to the annotation device 100 as previously described.

Additionally, the search result user interface 800 can have a group annotation portion 830. This group annotation portion 830 allows one user to perform a search, and the results of that search can be selected to indicate that a particular group of individuals should receive the object identifier for subsequent annotation. For example, during a setup procedure, a certain user group is defined comprising a number of users. Therefore, by selecting the group annotation portion of the search result user interface 800, the selected results are automatically transferred to the remaining members of the user group upon synchronization of their individual annotation devices.

Figure 4:
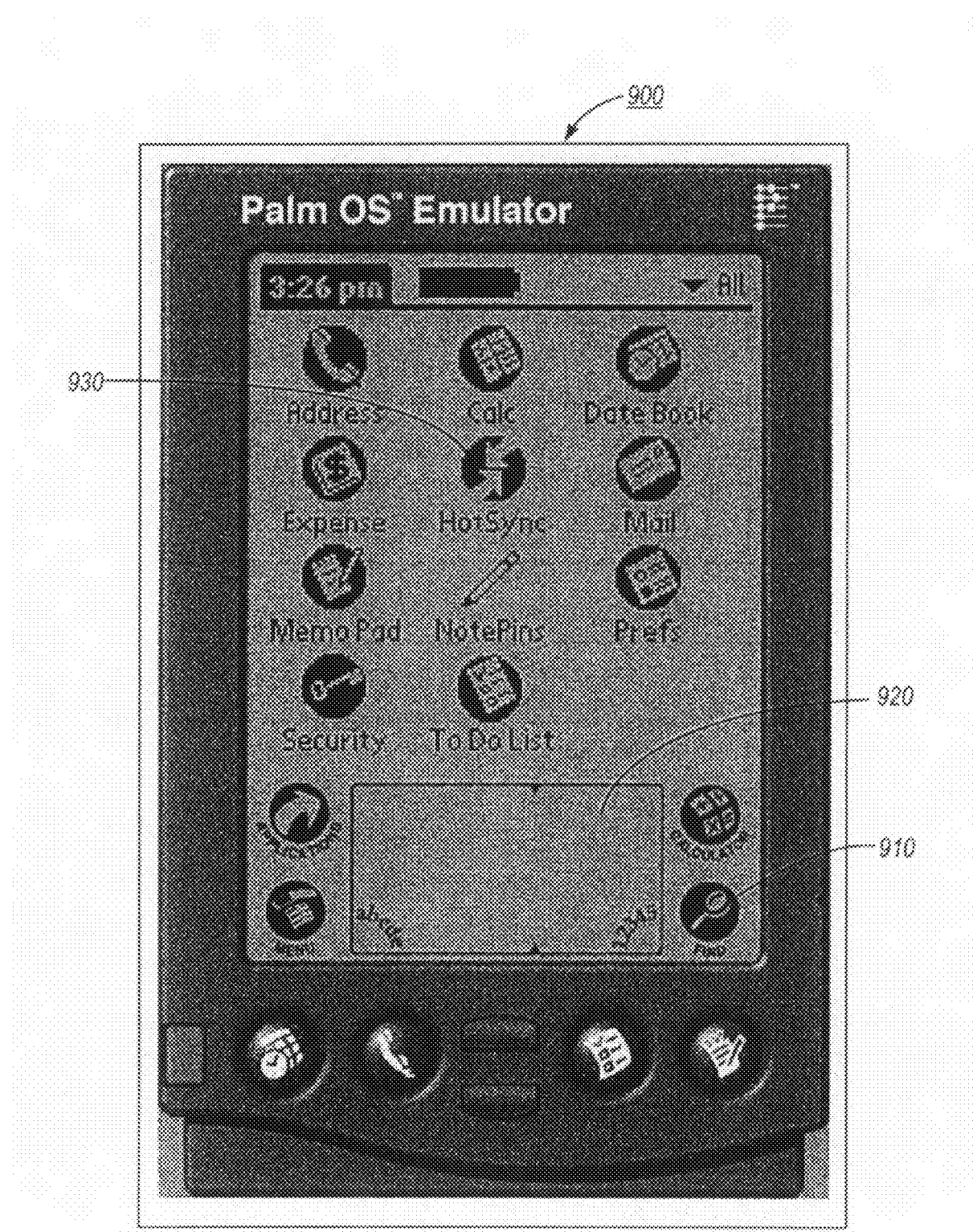
FIG. 4 illustrates a first exemplary screen shot of an exemplary annotation device in accordance with the systems and methods of this invention.

FIG. 4 illustrates an exemplary user interface that may be seen on an annotation device 900, such as a hand-held annotation device, as opposed to the interface on, for example, the desktop computer of FIG. 2. The annotation device 900 includes one or more selectable portions including a find button 910, a text entry portion 920 and a synchronize button 930. Upon locating the one or more objects to annotate, the user can then select the synchronize button 930 to transfer the object identifier corresponding to the found object(s) to the annotation device. The text entry portion 920 allows entry of data, such as annotations, into the annotation device. Additionally, the find button 910 allows for a search of the object (s) already transferred to the annotation device.

Figure 5:
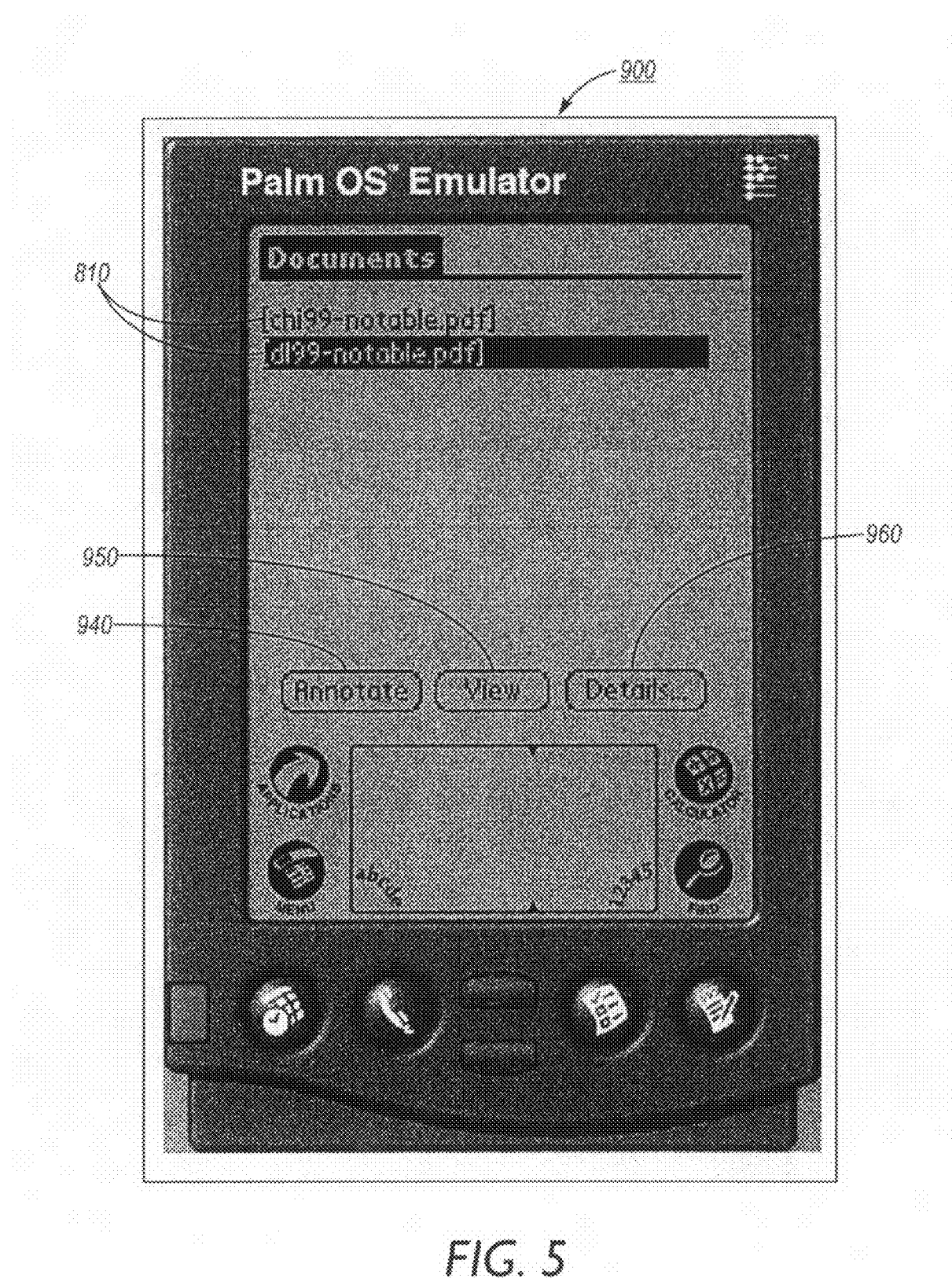
FIG. 5 illustrates a second exemplary screen shot of an exemplary annotation device in accordance with the systems and methods of this invention.

FIG. 5 illustrates an exemplary objects page that can be displayed on the annotation device 900. In particular, and as previously discussed, the objects page includes one or more objects 810 for which object identifiers have been transferred to the annotation device. A user can then select, for example with a stylus, one or more of the objects 810 to annotate. Upon selecting one or more objects 810, the user selects the annotate button 940. Alternatively, a user can select a view button 950, for example, to view the surrogate of the object directly, for example, the ASCII version in the case of a document, or select the details button 960, which, for example, could provide details about the object, such as whether annotations already exist, or other information that may be appropriate.

Upon selection of an object 810 to annotate, the annotation device, as previously discussed, enters an annotation mode that allows the user to select, either via a region selection or a phrase completion portions of an object to be annotated. However, it is to be understood that if a user wishes to generally associate annotations with an object, the region determination and phrase completion routine may not be needed.

Figure 6:
FIG. 6 illustrates a third exemplary screen shot of an exemplary annotation device in accordance with the systems and methods of this invention.

FIG. 6 illustrates an exemplary user interface that may be displayed after selection of an object to annotate and transfer of the object identifier to the annotation device. The user interface can comprise options for selecting regions of a object to annotate as well as a phrase-completion option. In particular, a predefined region of an object may be defined such as the "top of document" region 970. Alternatively, a thumbnail 980 may be displayed that corresponds to a visual representation of an object. The user can then point to positions within the thumbnail 980 and associate one or more annotations with that particular portion. Furthermore, the user can select an "enter the phrase" portion 990 to implement the phrase completion routine as previously discussed. Then, upon selecting a region with which to associate an annotation, a user enters, via the text entry portion 920, the annotations that are to be associated with that particular region. Upon completion of the annotations, the user presses the done button 1000 to associate the annotations with that particular region. Alternatively, the user can press the cancel button 1010 to stop the annotation process.

Figure 7:
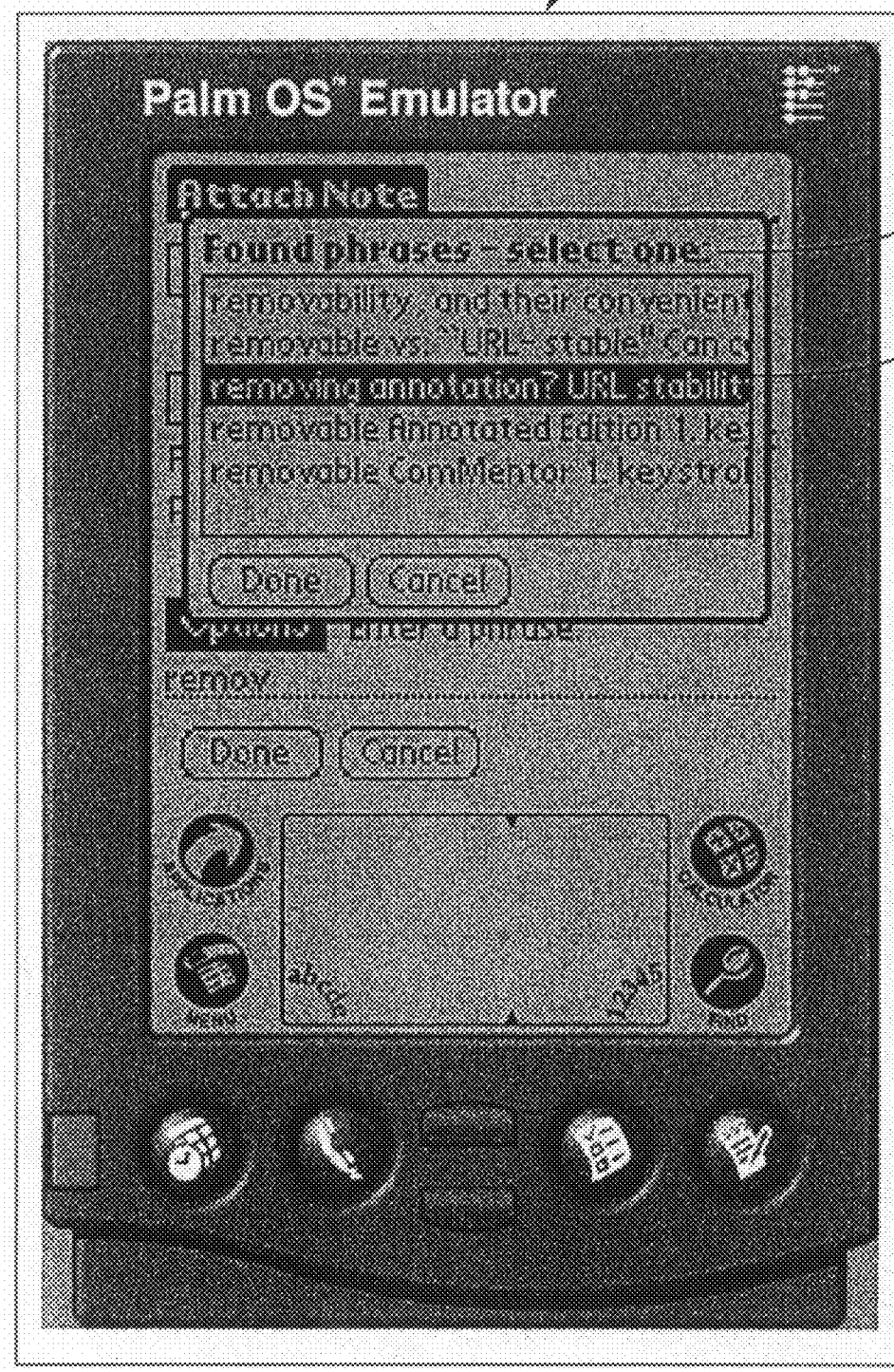
FIG. 7 illustrates a fourth exemplary screen shot of an exemplary annotation device in accordance with the systems and methods of this invention.

FIG. 7 illustrates an exemplary user interface that may be displayed if a user selects the "enter a phrase" portion 990. In particular, upon entry of one or more words, the phrase completion process is run and results of the process displayed in the phrase completion user interface 992. Then, upon the user selecting a resulting phrase corresponding to the one or more entered words, annotations can be associated with that phrase.

Figure 8:
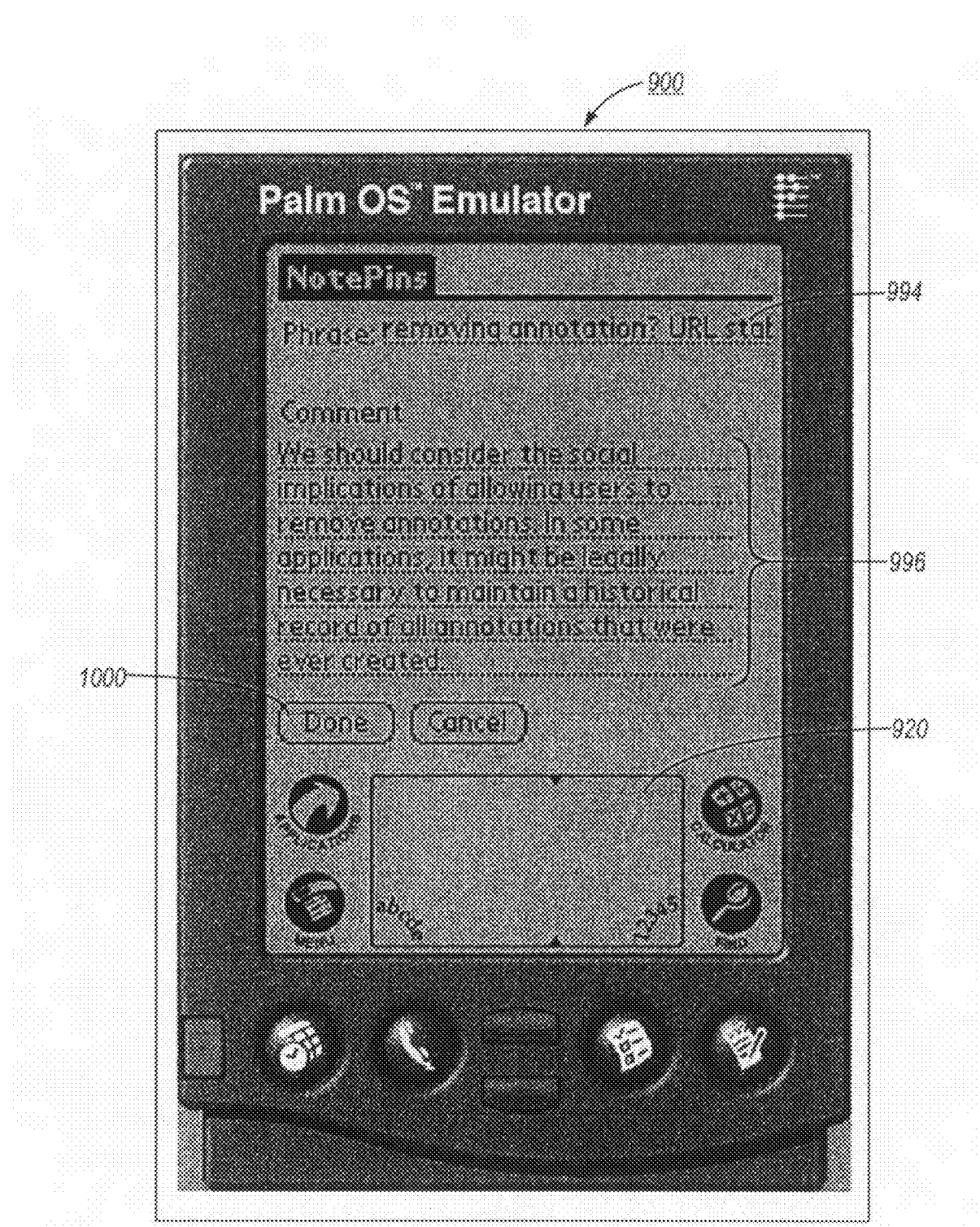
FIG. 8 illustrates a fifth exemplary screen shot of an exemplary annotation device in accordance with the systems and methods of this invention.

In particular, FIG. 8 illustrates an exemplary user interface that may be displayed upon selection of a particular phrase 994 with which to associate annotations. For example, the phrase 994 can be displayed at the top of the user interface. Additionally, a comments portions 996 can appear in the user interface displaying the annotations entered in the text entry portion 920. Then, upon completion of the annotations, the user selects the done button 1000 to associate the annotation with the selected phrase.

Figure 9A:
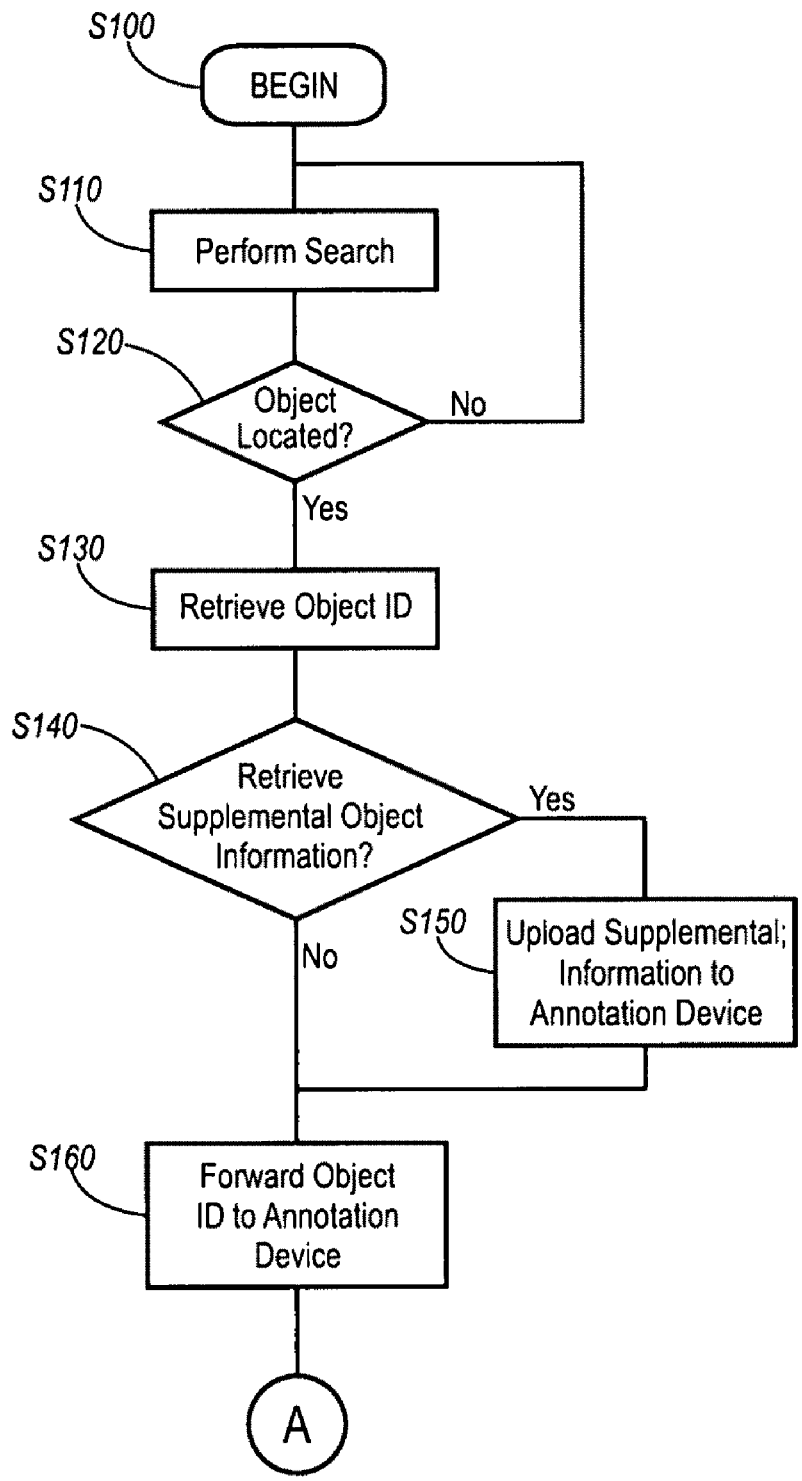
FIGS. 9A-9B are a flowchart outlining one exemplary embodiment of the method for associating annotations with an object according to this invention.
Figure 9B:
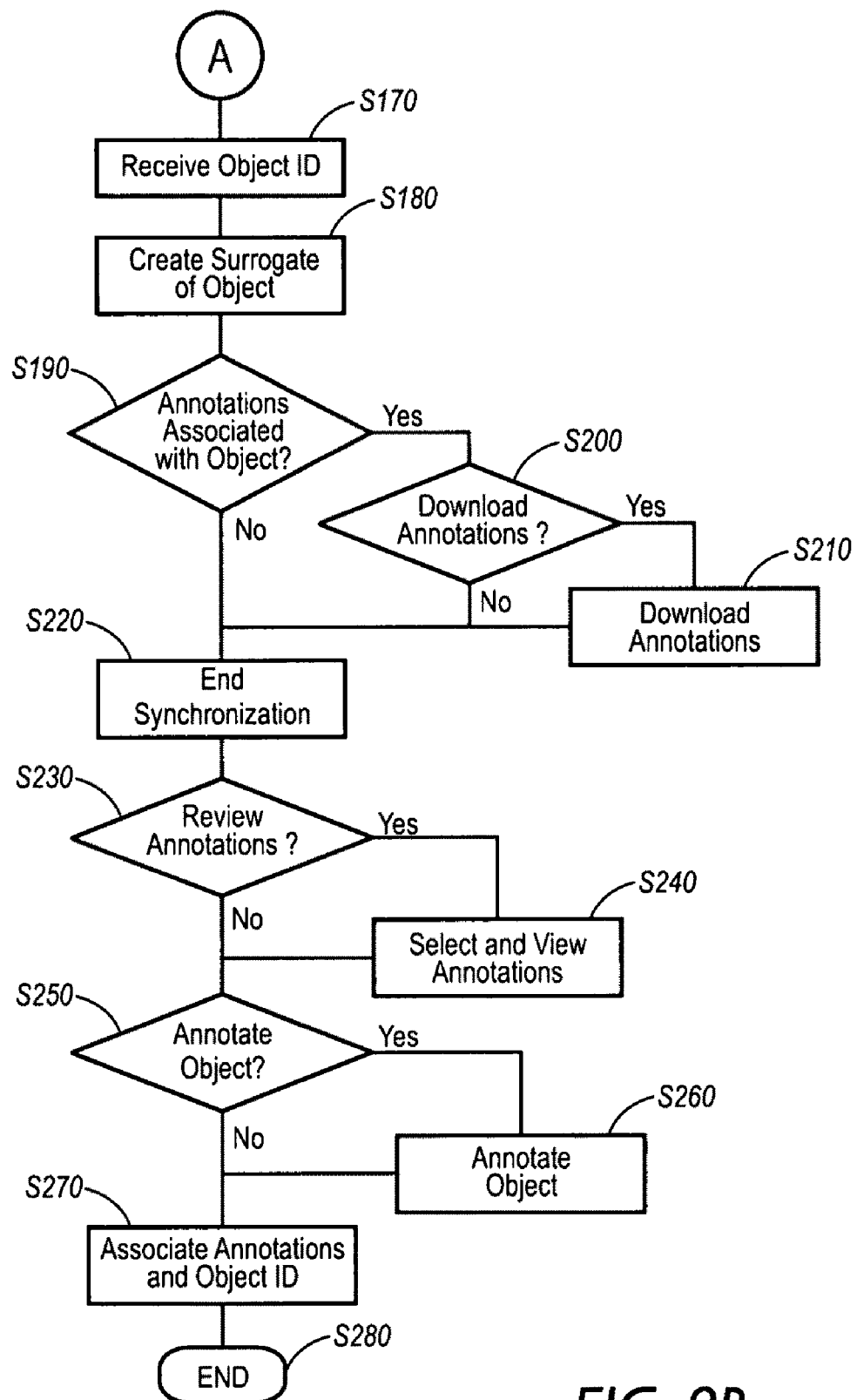

FIG. 9A illustrates an exemplary flowchart of the method for annotating an object in accordance with the methods of this invention. Specifically, control begins in step S100 and continues to step S110. In step S110, a search is performed for the object to annotate. Next, in step S120, a determination is made whether the object to annotate has been located. If the object to be annotated has not been located, control jumps back to step S110. Otherwise, control continues to step S130. In step S130, the object identifier associated with the object is retrieved. Next, in step S160, a determination is made whether supplemental information associated with the object should be retrieved. If the supplemental information is to be retrieved, control continues to step S150 where the supplemental information is uploaded to the annotation device. Note that if the search has been performed on the annotation device, this step is optional. Otherwise, control jumps to step S160.

In step S160, if the search step is not performed on the annotation device, the object identifier is forwarded to the annotation device. Control then continues to step S170.

In step S170, the object identifier is received at the annotation device. Next, in step S180, a surrogate of the object is created. Then, in step S190, a determination is made whether annotations are associated with the object. If annotations are not associated with the object, control jumps to step S220. Otherwise, control continues to step S200.

In step S200, a determination is made whether to download the annotations associated with the object to the annotation device. If the previous annotations are to be downloaded, control continues to step S210 where the annotations are downloaded to the annotation device. Control then continues to step S220.

In step S220, the synchronization of the annotation device and the object ends. Next, in step S230, a determination is made whether to review any annotations that may be associated with the object. If the previous annotations are to be reviewed, control continues to step S240 where the previous annotations are selected and viewed. Otherwise, control continues to step S250. However, it is to be appreciated that the flowchart could be varied depending on a particular usage scenario. For example, a user could first decide whether to review annotations and then, only if the answer is yes, determine if there are annotations associated with the object, and if so, download them.

In step S250, a determination is made whether to annotate the object. If the object is to be annotated, control continues to step S260 where the object is annotated. Otherwise, control jumps step S270.

In step S270, the annotations are associated with the object identifier. Control then continues to step S280 where the control sequence ends.

Figure 10:
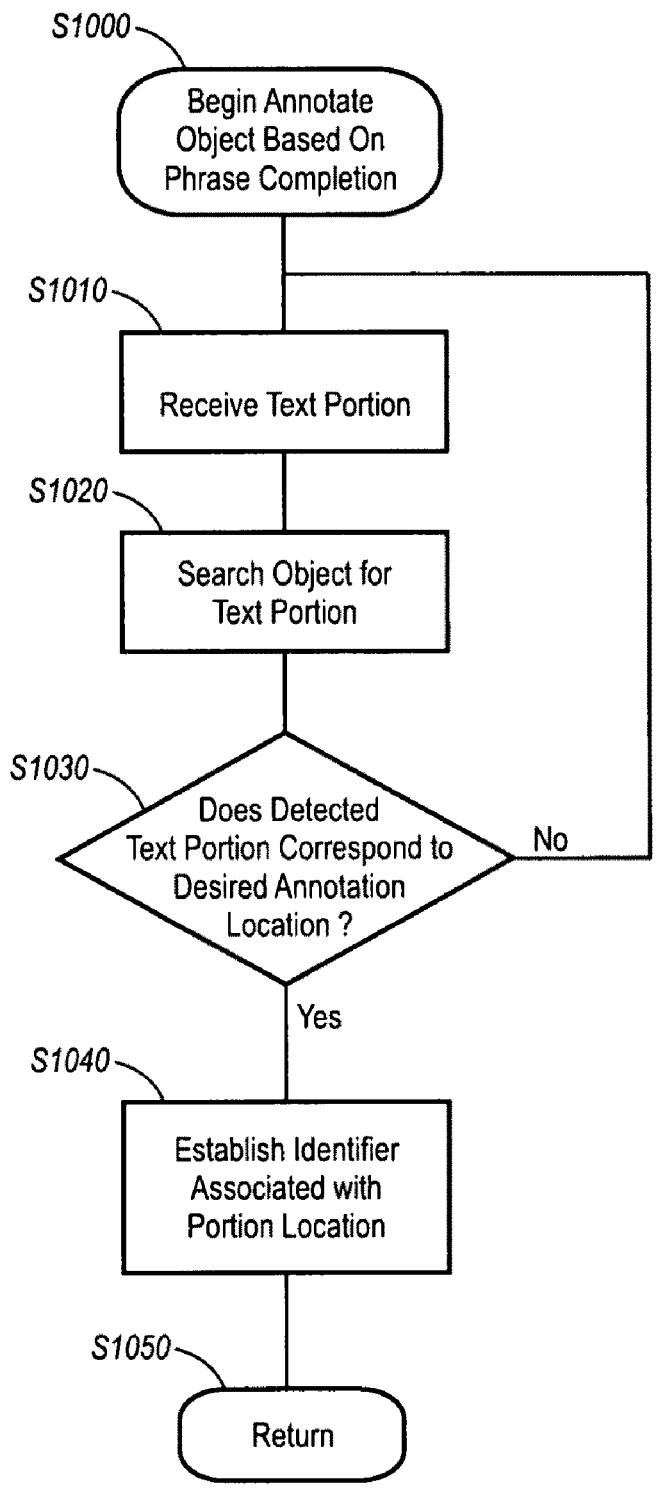
FIG. 10 is a flowchart outlining in greater detail the annotate object step of FIG. 9B.

FIG. 10 illustrates in greater detail one exemplary method for annotating an object based on the phrase completion technique. In particular, control begins in step S1000 and continues to step S1010. In step S1010 a text portion is received from a user. Next, in step S1020, the received text portion is searched for in the surrogate of the object. Then, in step S1030, a determination is made whether the searched for and detected text portion corresponds to the desired location for attaching an annotation. If the detected portion does correspond to the desired annotation location control continues to step S1040. Otherwise, control returns to step S1010.

In step S1040, an identifier associated with the portion location is established. Control then continues to step S1050 where the control sequence returns to step S270.

Figure 11:
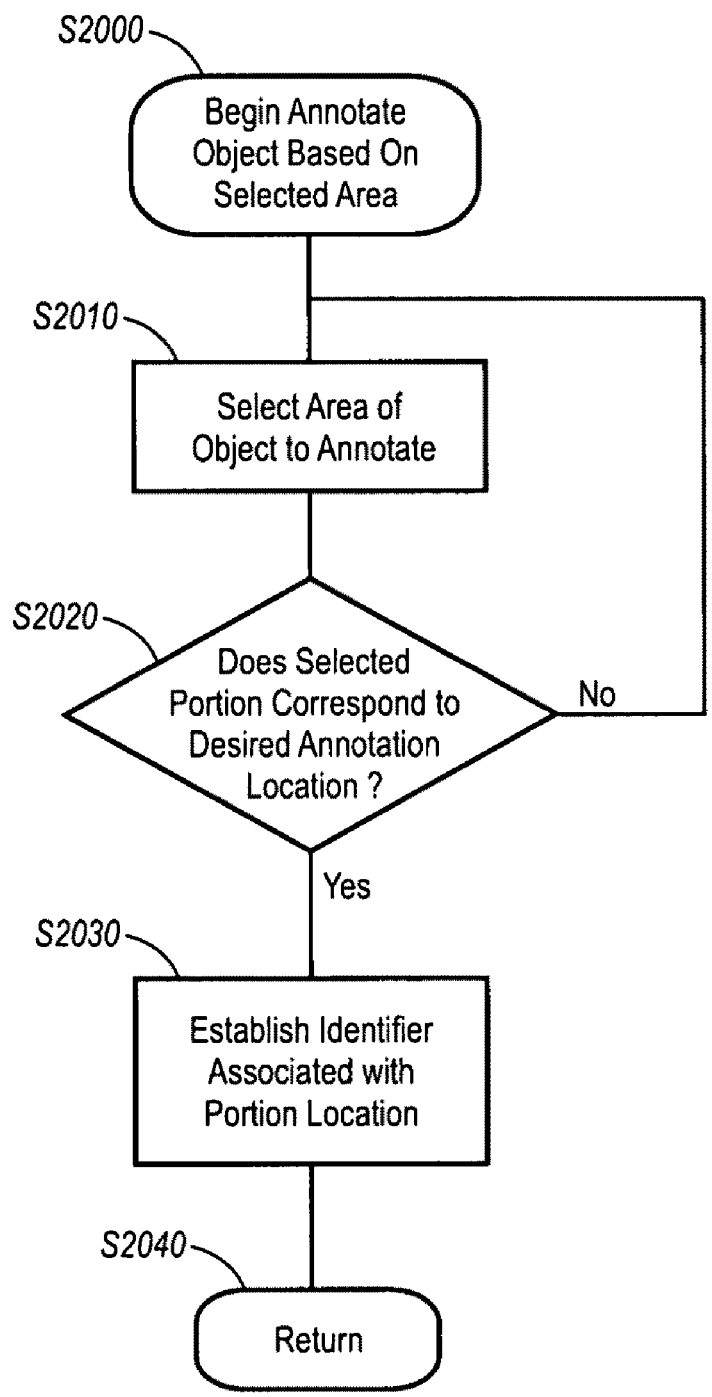
FIG. 11 is a flowchart outlining in greater detail the annotate object step of FIG. 9B.

FIG. 11 illustrates in greater detail the annotation of an object based on selection of an area. In particular, control begins in step S2000 and continues to step S2010. In step S2010, an area of the object, for example, in a thumbnail representation, is selected for annotation. Next, in step S2020, a determination is made whether the selected portion corresponds to the desired annotation location. If the selected portion does correspond to the desired annotation location, control continues to step S2030. Otherwise, control returns to step S2010.

In step S2030, an identifier associated with the selected portion location is established. Control then continues step S2040 where control returns to step S270.

Figure 12:
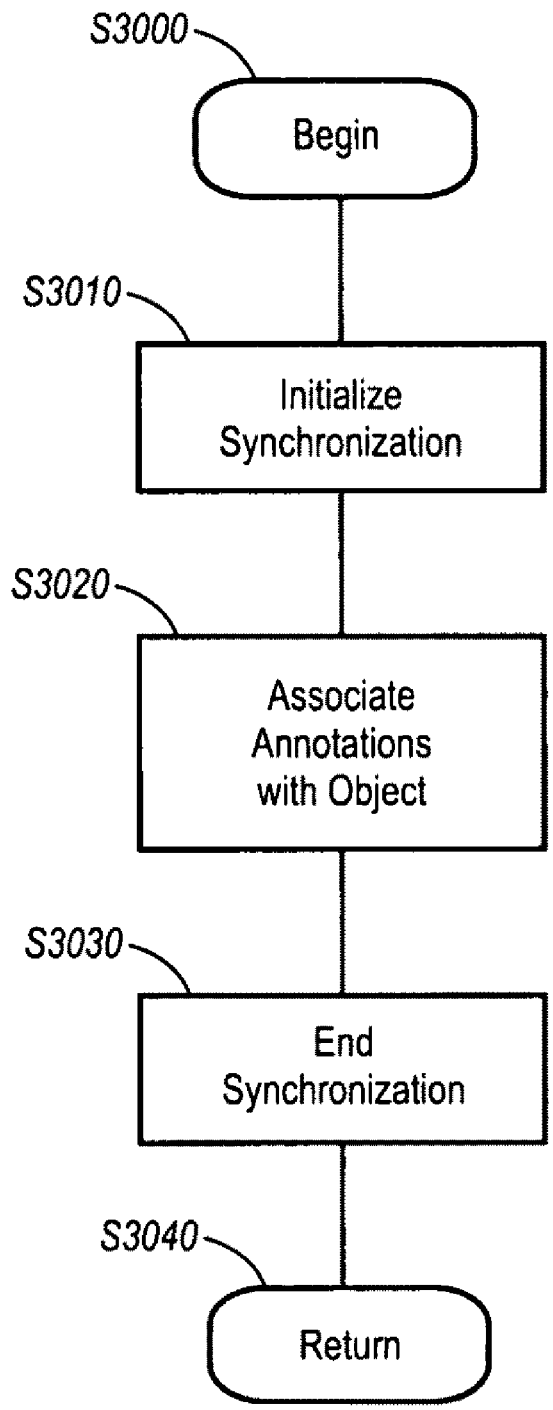
FIG. 12 is a flowchart outlining an exemplary embodiment of the synchronization of the annotations with an object according to this invention.

FIG. 12 illustrates an exemplary method for synchronizing annotations with an object. In particular, control begins step S3000 and continues to step S3010. In step S3010, the synchronization is initialized. Next, in step S3020, the annotations stored on the annotation device are associated with the object. Then, in step S3030, the synchronization ends. Control then continues to step S3040 where the control sequence ends.

As shown in FIG. 1, the annotation system is preferably implemented either on a single program general purpose computer or separate program general purpose computer. However, the annotation system can also be implemented on a special purpose computer, a programmed microprocessor or microcontroller and peripheral integrated circuit element, an ASIC, or other integrated circuit, a digital signal processor, a hard wired electronic or logic circuit such as a discrete element circuit, a programmable logic device such as a PLD, PLA, FPGA, PAL, or the like. In general, any device capable of implementing a finite state machine that is, in turn capable of implementing a flowchart shown in FIGS. 9A-12, can be used to implement the annotation system.

Furthermore, the disclosed method may be readily implemented in software using object or object-oriented software development environments that provide portable source code that can be used on a variety of computer, workstation and/or personal digital assistant hardware devices. Alternatively, the disclosed annotation system may be implemented partially or fully in a hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The annotation systems and methods described above, however, can be readily implemented in hardware or software using any known or later-developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of this invention can be implemented as a routine embedded on a personal computer such as Java® or CGI script, as a resource residing on a server or graphics workstation, as a routine embedded in a annotation system, personal digital assistant interface, or the like. The annotation system can also be implemented by physically incorporating the system and method into a software and/or hardware system, such as the hardware and software systems of a graphics workstation or dedicated annotation control system.

It is, therefore, apparent that there has been provided, in accordance with the present invention, systems and methods for searching distributed networks. While this invention has described the conjunction preferred embodiments thereof, it is evident that many alternatives, modifications, and variations are only apparent to those skilled in the art. Accordingly, Applicants intend to embrace all such alternatives, modifications and variations that follow in the spirit and scope of this invention.

What is claimed is:

1. An annotation system that associates annotations with at least one object, the annotation system comprising:
    a viewing device for viewing at least one object, the viewing device being separate and distinct from an annotation device;
    a search circuit that locates the at least one object to be annotated and provides an object identifier that corresponds to the at least one object;
    the annotation device allowing a user to make at least one annotation independently from the at least one object, the annotation device comprising:
    an input device that inputs the at least one annotation;

an annotation linking circuit that establishes a link, via a processor, associating the at least one annotation with at least one portion of the object;
a database that stores the object identifier, the at least one annotation and the link; and
a synchronize circuit that associates the at least one annotation with the at least one portion of the object based on the link and the object identifier,
wherein the user makes the at least one annotation using the annotation device while viewing the at least one object using the viewing device, and upon synchronization by the synchronize circuit, the at least one annotation is associated with the object identifier at a time different and prior to a time when the synchronize circuit associates the at least one annotation with the at least one portion of the object based on the link and the object identifier,
the annotation device stores the at least one annotation in the database, and
the viewing device views the at least one annotation from the database.

2. The system of claim 1, wherein the annotation linking circuit establishes the link to the at least one portion of the object based on at least one of a graphical technique and a textual technique.

3. The system of claim 2, wherein the graphical technique associates the at least one annotation with the at least one portion of the object based on selection of at least one portion of a graphical icon that is a visual surrogate of the at least one object.

4. The system of claim 2, wherein the textual technique comprises associating the at least one annotation and at least one of a word, phrase or a portion of text, and the word, phrase or the portion of text is based upon a word, phrase or a portion of text within the at least one object.

5. The system of claim 4, wherein the textual technique is based on a phrase completion technique in which a phrase to be completed is based upon a phrase within the at least one object.

6. The system of claim 1, wherein the search circuit is located in at least one of the annotation device, a personal computer and a networked search engine.

7. The system of claim 1, wherein the search circuit receives at least one of the object identifier and one or more key words corresponding to the object to be annotated.

8. The system of claim 1, wherein the annotation database is configured to store the at least one annotation and the object identifier for the at least one object.

9. The system of claim 8, wherein the annotation database is located on a distributed network.

10. The system of claim 8, wherein the annotation database stores at least one annotation previously associated with the at least one object.

11. The system of claim 1, wherein the at least one object is at least one of a media object, a device object, a location object and a digital document.

12. The system of claim 1, wherein the annotation device is a portable personal digital assistant, which is decoupled from the at least one object when the annotation is made.

13. The system of claim 1, wherein the object identifier is collocated with the at least one object.

14. A method for associating annotations with at least one object comprising:
searching for the at least one object to annotate;
obtaining an object identifier for the at least one object;
generating at least one annotation using an annotation device and an input device that is distinct from the annotation device, while displaying the at least one object with a viewing device that is distinct from the annotation device;
establishing a link associating the at least one annotation with the object;
transferring the at least one annotation to the at least one object by associating the at least one annotation with the object identifier at a time different and prior to associating the at least one annotation with the at least one portion of the object based on the link and the object identifier;
storing the at least one annotation in a database by the annotation device; and
viewing the at least one annotation from the database by the viewing device.

15. The method of claim 14, wherein associating the at least one annotation with the at least one portion of the object is based on at least one of a graphical technique and a textual technique.

16. The method of claim 15, wherein the graphical technique associates the at least one annotation with the at least one portion of the at object based on selection of at least one portion of a graphical icon that is a visual surrogate of the at least one object.

17. The method of claim 15, wherein the textual technique comprises associating the at least one annotation and at least one of a word, phrase or a portion of text, and the word, phrase or the portion of text is based upon a word, phrase or a portion of text within the at least one object.

18. The method of claim 17, wherein the textual technique is based on a phrase completion technique in which a phrase to be completed is based on a phrase within the at least one object.

19. The method of claim 14, further comprising associating the object identifier and the at least one object.

20. The method of claim 14, further comprising retrieving supplemental information associated with the at least one object.

21. The method of claim 14, further comprising developing a digital surrogate of the at least one object.

22. The method of claim 14, further comprising retrieving at least one previous annotation associated with the at least one object.

23. The method of claim 22, further comprising annotating the at least one object while the annotation device is decoupled from the object.

24. The method of claim 14, wherein searching for the at least one object comprises:
entering at least one of a description of the object and the object identifier; and
searching at least one of a networked search engine, a personal computer and a distributed network.

25. The method of claim 14, wherein the at least one object is at least one of a media object, a device object, a location object and a digital document.

26. An information storage media that stores a control program for associating annotations with at least one object, the control program including instructions for:
searching for the at least one object to annotate;
obtaining an object identifier for the at least one object;
generating at least one annotation using an annotation device and an input device while displaying the at least one object and the at least one annotation with a viewing device that is distinct from the annotation device;
establishing a link associating the at least one annotation with at least one portion of the object;

transferring the at least one annotation to the at least one object by associating the at least one annotation with the object identifier at a time different and prior to associating the at least one annotation with the at least one portion of the object based on the link and the object identifier;

storing the at least one annotation in a database by the annotation device; and viewing the at least one annotation from the database by the viewing device.

27. The information storage media of claim 26, wherein the instructions for associating the at least one annotation with the at least one portion of the object are based on at least one of a graphical technique and a textual technique.

28. The information storage media of claim 27, wherein the graphical technique associates the at least one annotation with the at least one portion of the object based on selection of at least one portion of a graphical icon that is a visual surrogate of the at least one object.

29. The information storage media of claim 27, wherein the textual technique comprises associating the at least one annotation and at least one of a word, phrase or a portion of text, and the word, phrase or the portion of text is based upon a word, phrase or a portion of text within the at least one object.

30. The information storage media of claim 29, wherein the textual technique is based on a phrase completion technique in which a phrase to be completed is based on a phrase within the at least one object.

31. The information storage media of claim 26, the control program further including instructions for associating the object identifier and the at least one object.

32. The information storage media of claim 26, the control program further including instructions for retrieving supplemental information associated with the at least one object.

33. The information storage media of claim 26, the control program further including instructions for developing a digital surrogate of the at least one object.

34. The information storage media of claim 26, the control program further including instructions for retrieving at least one previous annotation associated with the at least one object.

35. The information storage media of claim 34, the control program further including instructions for annotating at least one of the at least one previous annotation.

36. The information storage media of claim 26, the instructions for searching for the at least one object further include instructions for:

specifying at least one of a description of the object and the object identifier; and searching at least one of a networked search engine, a personal computer and a distributed network.

37. The information storage media of claim 26, wherein the at least one object is at least one of a media object, a device object, a location object and a digital document.

* * * * *